May 21, 1929. C. E. DANSEREAU 1,713,821
CONNECTER FOR CHAIN LINKS
Filed April 27, 1927
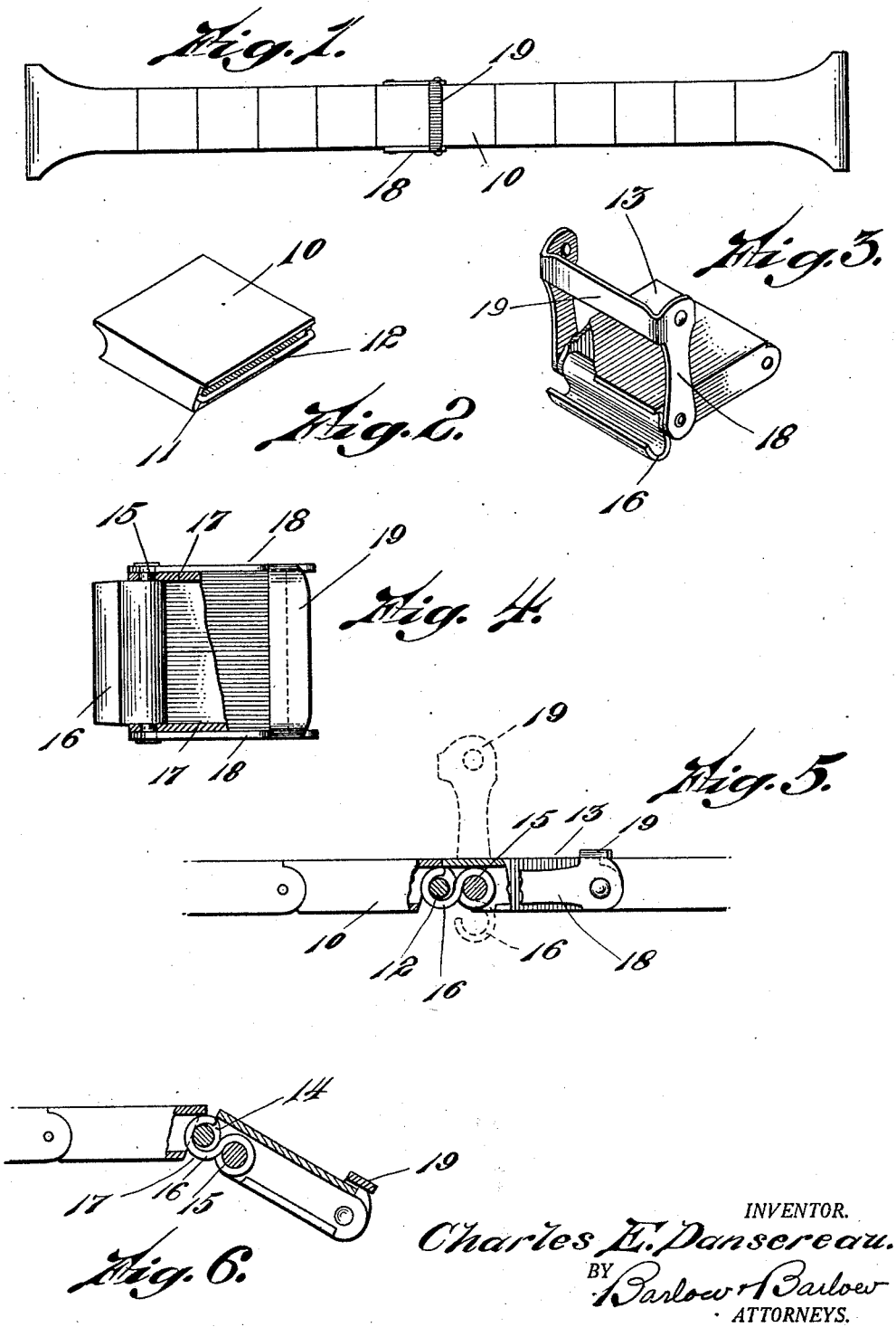
INVENTOR.
Charles E. Dansereau.
BY Barlow & Barlow
ATTORNEYS.

Patented May 21, 1929.

1,713,821

UNITED STATES PATENT OFFICE.

CHARLES EDWARD DANSEREAU, OF PROVIDENCE, RHODE ISLAND, ASSIGNOR TO LOUIS STERN COMPANY, OF PROVIDENCE, RHODE ISLAND, A CORPORATION OF RHODE ISLAND.

CONNECTER FOR CHAIN LINKS.

Application filed April 27, 1927. Serial No. 186,973.

This invention relates to an improved connecter for the ends of bracelets or chain links; and has for its object to provide a connecter of this character by which the terminal links of the bracelet may be readily connected to and disconnected from each other through the medium of a pivoted hook member.

A further object of the invention is the provision of a connecter hook member pivotally mounted near one end of the links, the hook being provided with an operating arm arranged to swing outwardly relative to the front of the link on which it is mounted to move the hook to open or released position and back to close the hook.

A still further object of the invention is the provision of a bar or other element on the adjacent link to receive this connecting hook whereby the two ends of the chain may be readily connected together and disconnected from each other.

A still further object of the invention is the provision of a pair of operating arms for the hook which are arranged to extend along opposite sides of the link, the arms being connected by a cross bar over the top of the link, whereby it may be readily engaged for moving the hook to open and closed positions.

With these and other objects in view, the invention consists of certain novel features of construction, as will be more fully described, and particularly pointed out in the appended claims.

In the accompanying drawings:

Figure 1 is a view of the bracelet extended.

Figure 2 is a perspective view of one of the links showing the attaching bar at the end thereof.

Figure 3 is a perspective view of the hook-carrying link showing the operating arm raised and the hook in open position.

Figure 4 is a plan view partly in section illustrating the way the hook is mounted on the box-shaped link.

Figure 5 is a side elevation partly in section showing the two links as connected together by my improved connecter.

Figure 6 is a sectional view showing how the undercut portion of the link permits a relative swinging action of these connected links.

It is found in practice of advantage to provide in a chain or bracelet particularly in a bracelet to be able to disconnect the links near its middle portion instead of being obliged to disconnect the links from the bail of the wrist watch to which its opposite ends are attached, and to accomplish this in a simple and effective way, I have pivoted a hook member onto the end of one of the links and arranged a pair of operating arms to extend along opposite sides of the link, the arms being connected together over the front of the link so as to permit the hook to be readily operated and the bracelet separated at its middle portion to be removed from the arm of the wearer; and the following is a detailed description of the present embodiment of my invention and showing one means by which these advantageous results may be accomplished:

With reference to the drawings, 10 designates one of the middle links of the bracelet or chain which as herein shown is of the box type of link, the link being preferably undercut slightly at its end as at 11 and is provided with a connecting cross bar 12. The other adjacent middle link 13 of the chain or bracelet is herein shown as being of the box type of link and is also undercut slightly as at 14 to permit a relative swinging motion and a pivot pin 15 extends across its end portion carrying a hook 16. The ends of this pivot pin are arranged to extend through the opposite side walls 17 of the link and to the extending ends are fixed the arms 18 which are arranged to lie along the opposite sides of the link, their outer ends being connected by the cross bar 19 which lies closely against the front face of the link when the hook is in closed position so that when the hook is in closed position this bar may be easily engaged and lifted to swing the hook to open position, as illustrated at 19 in Figure 5 which position swings the hook out of engagement with the bar 12 and releases the two adjacent links to be separated one from the other, and to connect these links it is only necessary to move the opened hook into engagement with the cross bar 12 and then swing the arms 19 down until the cross bar rests against the upper face of the link.

The device is extremely simple and practical in construction and is effective in its operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A connecter for chain links comprising a box-shaped link, a pivot pin extending through the side walls of the link, a hook fixed to the pin between said side walls, and an operating arm connected to the pin to extend along the outside wall of the link.

2. A connecter for chain links comprising a box-shaped link, a pivot pin extending through the side walls of the link, a hook fixed to the pin between said side walls, an operating arm connected to the pin to extend along the outside wall of the link, and having an operating member extending over the front of the link.

3. A connecter for chain links comprising a box-shaped link, a pivot pin extending through the side walls of the link, a hook fixed to the pin between said side walls, an operating arm connected to the pin to extend along the outside wall of the link having an operating member extending over the front of the link, and a cooperating hook-receiving member on the end of the adjacent link.

4. A connecter for chain links comprising a box-shaped link, a pivot pin extending through the side walls of the link, a hook fixed to the pin between said side walls, an operating arm connected to the pin to extend along the outside wall of the link and having an operating member extending over the front of the link, a detent member for releasably retaining said arm in operating position, and a cooperating hook-receiving member on the end of the adjacent link.

5. A connecter for chain links, comprising, a hook having a mouth open generally upwardly and pivoted to one of the links and an operating arm extending along said link and attached to said hook at its pivot to swing the same to open position by an upward movement thereof, and a hook receiving element on an adjacent link.

6. A connecter for chain links comprising a box-shaped terminal link, a hook pivoted at one end of the link, a pair of operating arms secured to the hook at its pivot and arranged to extend along the opposite sides of the link and connected together over the front of the link by a cross arm.

7. A connecter for chain links comprising a box-shaped terminal link, a hook pivoted at one end of the link, a pair of operating arms secured to the hook at its pivot and arranged to extend along the opposite sides of the link and connected together over the front of the link by a cross arm, and a detent on said arms to releasably retain them and the hook in operating position.

8. A connecter for chain links comprising a box-shaped terminal link, an arm pivotally connected to the link, a hook at one end of said arm, means for pivotally mounting said arm and hook to the terminal link in a position to cause said arm to extend along the side of said terminal link when the hook is in closed position, and a hook-receiving element on an adjacent link.

In testimony whereof I affix my signature.

CHARLES EDWARD DANSEREAU.